(12) United States Patent
Xie

(10) Patent No.: US 7,050,561 B2
(45) Date of Patent: May 23, 2006

(54) RESTORATION SCHEME FOR MESH-BASED SWITCHING NETWORKS

(75) Inventor: Raymond Yinggang Xie, Westford, MA (US)

(73) Assignee: Sycamore Networks, Inc., Chelmsford, MA (US)

(*) Notice: Subject to any disclaimer, the term of this patent is extended or adjusted under 35 U.S.C. 154(b) by 731 days.

(21) Appl. No.: 09/910,652

(22) Filed: Jul. 19, 2001

(65) Prior Publication Data

US 2003/0016809 A1 Jan. 23, 2003

(51) Int. Cl.
*H04M 7/00* (2006.01)

(52) U.S. Cl. .......................... 379/221.01; 379/221.02; 379/221.03; 379/221.04; 379/221.06; 709/239

(58) Field of Classification Search ........... 379/221.06, 379/221.01, 221.02, 221.03, 221.04; 709/239
See application file for complete search history.

(56) References Cited

U.S. PATENT DOCUMENTS

| | | | | |
|---|---|---|---|---|
| 4,284,852 A * | 8/1981 | Szybicki et al. | ....... | 379/221.01 |
| 4,669,113 A * | 5/1987 | Ash et al. | ............... | 379/221.01 |
| 4,991,204 A * | 2/1991 | Yamamoto et al. | .... | 379/221.01 |
| 5,142,570 A * | 8/1992 | Chaudhary et al. | .... | 379/221.07 |
| 5,838,769 A * | 11/1998 | McNeil et al. | ................ | 379/14 |
| 6,289,096 B1 * | 9/2001 | Suzuki | ................... | 379/221.01 |
| 6,430,150 B1 * | 8/2002 | Azuma et al. | .............. | 370/218 |
| 6,816,585 B1 * | 11/2004 | Blatt et al. | ............. | 379/221.03 |

OTHER PUBLICATIONS

Anderson, L. et al., "Belated new LDP draft" (Mar. 1998) Retrieved from Internet on Jan. 2, 2001 http://cell.onecall.net/mhonarc/mpls/1998-Mar/msg00059.html.
Bhandari, R. et al., "High level requirements for optical shared mesh restoration," Internet Engineering Task Force Retrieved from Internet on Jun. 13, 2001 http://search.ietf.org/internet-drafts/draft-bhandari-optical-restoration-00.txt.
Rosen, E. C. et al., "Multiprotocol label switching architecture," Network Working Group (Jul. 2000) retrieved from Internet on Jan. 3, 2001 http://www.ietf.org/internet-drafts/draft-ietf-mpls-arch-07.txt.
Sonet, retrieved from internet on Dec. 11, 2000 http://www.ece.wpi.edu/courses/ee535/hwk11cd95/dks1/dks1.html.

* cited by examiner

*Primary Examiner*—Bing Q. Bui
*Assistant Examiner*—Quynh H. Nguyen
(74) *Attorney, Agent, or Firm*—Lahive & Cockfield, LLP

(57) ABSTRACT

A method and apparatus are provided for the management of multiple-node networks to provide for efficient and rapid determination of an alternative connection path through the network to avoid a fault in the connection path. The present invention seeks to minimize the number of nodes affected by the alternative connection path by systematically seeking alternative, non-retracing connection paths from nodes neighboring the connection fault. Until an alternative connection is found, searches are conducted from nodes further from the connection fault. Optionally, the present invention may use a retracing path to establish a connection.

21 Claims, 3 Drawing Sheets

RESTORATION SCHEME FOR MESH-BASED SWITCHING NETWORKS

FIELD OF THE INVENTION

The invention relates generally to the management of networks, and, more particularly, to the efficient and rapid determination of an alternative connection path through the network to avoid a fault in a connection path.

BACKGROUND OF THE INVENTION

Communications networks typically can overcome failures in connections between nodes, while enabling operation of each node of the network. Overcoming such failures, however, can be time consuming and can result in a poor use of resources. For example, if a communications failure occurs along a connection between two nodes, typically the network abandons the entire connection and builds an alternative route anew.

SUMMARY OF THE INVENTION

The present invention overcomes the difficulties and inefficiencies of conventional network management methods and devices by minimizing the impact to the network in overcoming a communications failure. Specifically, the present invention seeks to minimize the number of nodes altered by the new connection path avoiding the communications failure. Accordingly, the present invention is capable of providing substantial speed advantages in overcoming a network communications failure.

According to an embodiment of the present invention, a method for managing a network having a plurality of nodes and a connection failure along a first connection path, between a first node and a second node, is provided. The step of determining whether a first connection can be established between the first node and the second node is provided. If the first connection cannot be established, the step of determining whether a second connection can be established between the first node and a third node located after the second node along the first connection path occurs. As will be apparent from the description of the invention herein, the third node is not necessarily the node immediately after the second node. If the first connection and the second connection cannot be established, a determination is made whether a third connection can be established between a fourth node located before the first node along the first connection path and the second node. As will be apparent from the description of the invention herein, the fourth node is not necessarily the node immediately before the first node. If the first connection and the second connection and the third connection cannot be established, it is determined whether a fourth connection can be established between the fourth node located before the first node along the first connection path and the third node. Preferably, only non-retracing connections are provided.

According to an illustrative embodiment, a method for managing a network having a N-hop connection C from a node N0 to a node Nn and a connection failure between a node Nk and a node Nk+1, is provided where 0<=k<n. It is determined whether a first connection can be established between the node Nk and the node Nk+1. If the first connection cannot be established, it is determined whether a second connection can be established between the node Nk and a node Nk+i, where i is incremented from 1 to n−k until a determination that the second connection can be established. If the first connection and the second connection cannot be established, a determination is made regarding whether a third connection can be established between a node Nk−j and the node Nk+i, where j is incremented from 1 to k and for every j, i is incremented from 1 to n−k, until a determination that the third connection can be established.

According to other embodiments of the invention, an apparatus is provided having a processor, a memory and a network interface, capable of communication with each other and adapted for performing the methods of the present invention. The apparatus may be located at each node of the network or may be centrally located.

BRIEF DESCRIPTION OF THE DRAWINGS

The foregoing and other objects, features and advantages of the invention will be apparent from the following description and apparent from the accompanying drawings, in which like reference characters refer to the same parts throughout the different views.

DETAILED DESCRIPTION OF THE INVENTION

As used herein a "connection" is an end-to-end communication channel that is established between two nodes traversing n other nodes, where n>=0. These two nodes can use the connection to exchange information without knowing how their messages pass through the network and reach the other end. One node is called "source node" and the other one is called "destination node." The source node is the node that tries to establish the communication channel first.

A connection may take many forms, including optical connections using fiber optics or electrical connections using wiring or via a wireless configuration.

A connection is said to be "retracing" if the connection has two identical nodes in the path. For example, a connection extending between node A and node E is a retracing connection if it has a path like A-B-C-D-C-E, where each of the letters represent nodes and the dashes represent connections between the nodes. A connection is said to be "non-retracing" if all nodes in its path are different from each other. For example, a connection from node A to node E is a non-retracing connection if it has a path like A-B-C-D-E.

The present invention, in various embodiments is designed to rapidly determine an alternative connection in the event a communication failure occurs. Preferably, the alternative connection will be a non-retracing connection. Embodiments of the present invention are applicable to a wide variety of network types, including wired and wireless electrical and optical networks. Furthermore, a wide variety of network protocols may be used in conjunction with embodiments of the present invention.

The present invention is preferably used with a mesh network. A mesh network is a network having at least one node connected to more than two other nodes. By way of contrast, a ring network is a network in which each node of the network is connected in series to other nodes of the network, resulting in each node connected to one or two other nodes. Benefits of the mesh network can include multiple alternative paths for connections through the network and continued operation of the network during failure of a node.

Figure 1:
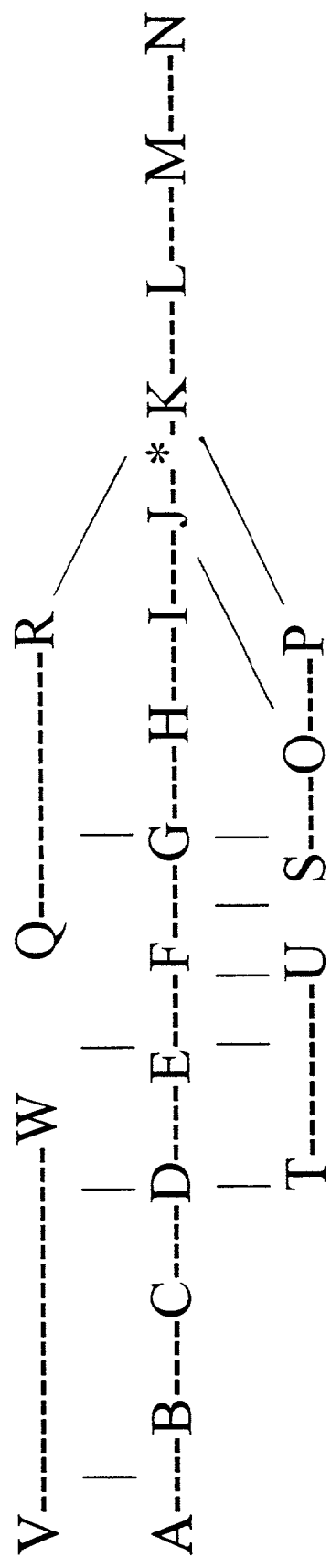
FIG. 1 provides a sample mesh network in order to illustrate an illustrative embodiment of the present invention.

A sample mesh network 50 is shown in FIG. 1. Each letter in FIG. 1 represents a node in the network 50. The lines in FIG. 1 represent connections between nodes. In the present example, each node in the network 50 is an optical cross-connect. There is an end-to-end circuit established from node A to node N traversing node B,C,D,E,F,G,H,I,J,K,L, and M. A circuit is a connection formed over a network. If the circuit is formed over an optical network, the circuit can be an optical connection or a path of light that transmits information at light speed. Alternatively, a circuit can be formed over other network types or combinations of network types and can also involve electrical connections of wired or wireless types.

Figure 2:
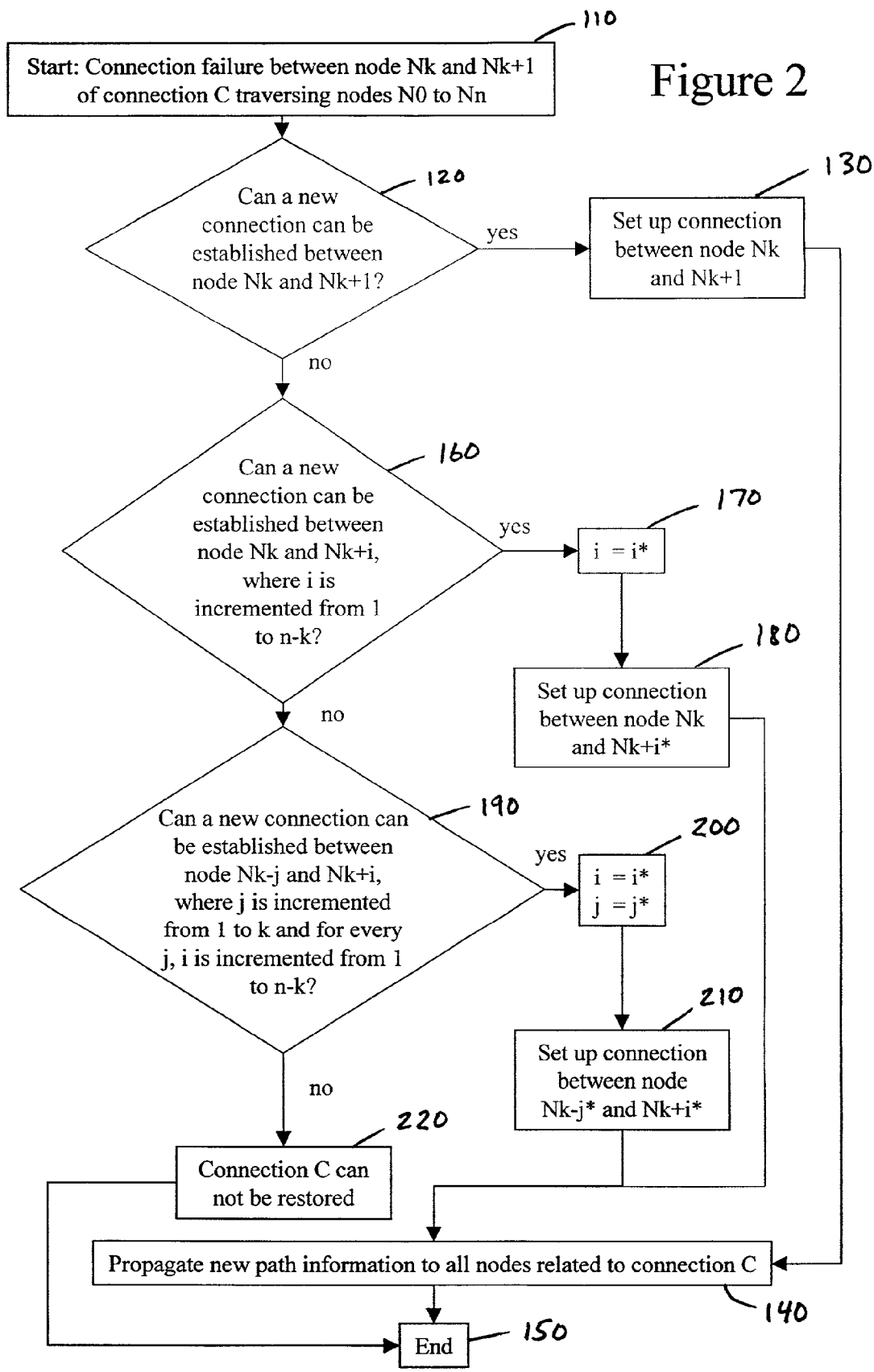
FIG. 2 depicts a flowchart illustrating the steps performed by the illustrative embodiment of the present invention in restoring the mesh network.

FIG. 2 illustrates the steps taken after failure to restore the network 50 in the illustrative embodiment. An illustrative embodiment of the invention will now be explained with reference to FIG. 2. An N-hop connection C is provided in a mesh network from node N0 to node Nn, traversing node N1, N2, ... and Nn−1. The connection C may be formed over a wide variety of networks, such as an optical network, an electrical wired or wireless network or any combination thereof.

Connections are typically formed by switches in the network. By activating switches, connection paths are established. In order to determine how switches are to be activated and how activation of switches will allow a connection path to reach the destination node, a wide variety of techniques are within the scope of the invention. For example, one method involves a topography table stored by each node of the network. The topography table includes information regarding each node of the network and routes between these nodes. Optionally, weights can be assigned to routes to allow some routes to be favored over other routes. Also, information related to current usage may be provided to allow for new connections to be formed over links that have greater available bandwidth. Another option involves the use of predefined, preferred routes that include a predetermined list of nodes to be used for connections between a source node and destination node. The predefined, preferred route is attempted first, allowing for other alternatives if the predefined, preferred route is unavailable.

Upon a connection failure, step 110, between node Nk and Nk+1, where 0<=k<n, the illustrative embodiment of the present invention will proceed to attempt to restore connection C. First, node Nk determines whether a new, non-retracing, connection can be established between node Nk and node Nk+1, step 120. If yes, the connection is set up between node Nk and node Nk+1, step 130. If the connection is set up between node Nk and node Nk+1, processing continues by propagating new path information to all nodes related to connection C, step 140, before finishing, step 150.

If a non-retracing connection cannot be established between node Nk and Nk+1 in step 120, processing continues by node Nk determining whether a new, non-retracing connection can be established between node Nk and node Nk+i, step 160. In step 160, "i" is changed from 1, 2, 3, ..., until i=n−k. If a non-retracing connection can be established between node Nk and node Nk+i, i* is set to i, step 170. The connection between node Nk and node Nk+i* is then set up, step 180. As above, processing then proceeds to propagate new path information to all nodes related to connection C, step 140, before finishing, step 150.

A connection may not be able to be established between two nodes for a variety of reasons. For example, a network route may not exist between the two nodes. Alternatively, an existing network route may not have additional capacity, as current network traffic is already utilizing the route's capacity. Also, a failure may exist in the available network routes. Such failures may be caused by a physical break in a network wire or optical cable or poor atmospheric conditions to enable a wireless connection. Also, malfunctioning transmitting or receiving equipment may prevent the use of an otherwise intact network route.

If a non-retracing connection cannot be established between node Nk and Nk+i in step 160, processing continues by node Nk−j determining whether a new, non-retracing connection can be established between node Nk−j and Nk+i, step 190. In step 190, "j" is changed from 1, 2, 3, ..., until j=k. For each value of j, i is changed from 1, 2, 3, ..., until i=n−k. If a non-retracing connection can be established between node Nk−j and node Nk+i, j* is set to j and i* is set to i, step 200. The connection between node Nk−j* and Nk+i* is then set up, step 210. As above, processing then proceeds to propagate new path information to all nodes related to connection C, step 140, before finishing, step 150.

If a non-retracing connection cannot be established between node Nk−j and Nk+i, connection C cannot be restored at that time, step 220.

The method provided in FIG. 2 of an illustrative embodiment of the present invention will now be discussed in relation to the sample mesh network 50 shown in FIG. 1. According to an illustrative embodiment of the invention, upon a communication failure, such as a failure caused by a fiber cut, between node J and node K, node J will check to determine if there is an alternative, non-retracing route to node K through either another trunk with a different conduit ID or another path traversing other nodes. For example, if there is an alternative route J-O-P-K available, then node J will send out signaling packets to node O, P and K, to set up a new connection and program cross-connects on those nodes. Therefore, in the present example, the connection is restored with new path A-B-C-D-E-F-G-H-I-J-0-P-K-L-M-N.

In the case of insufficient bandwidth available in the path J-O-P-K, node J will search for another route. If node J finds the path J-I-H-R-K, this path is a retracing path and will be discarded according to the illustrative embodiment of the invention. If J could not find a valid path to K, then it will try to find a path to L, M, and N.

If node J fails to restore the connection, it will release its cross-connect for this connection, and pass the job to node I. Node I will proceed similarly to the actions of node J in attempting to set up a connection to node K, L, M and N. If connections to each of these nodes cannot be completed, node I will release its cross-connect for this connection and pass the job to node H.

If all intermediate nodes fail to restore the connection, the source node A will try to set up a new connection to K, then L, then M. If they all fail, then the node A will try to set up a connection to the destination node, node N. The last step is equivalent to a simple source reroute.

According to an alternative embodiment of the invention, a connection can be a retracing connection. Also, according to a further alternative embodiment, the number of retracing nodes can be limited. For example, a connection can be permitted to retrace over a maximum of two nodes, but a path involving retracing over three nodes would not be permitted.

Figure 3:
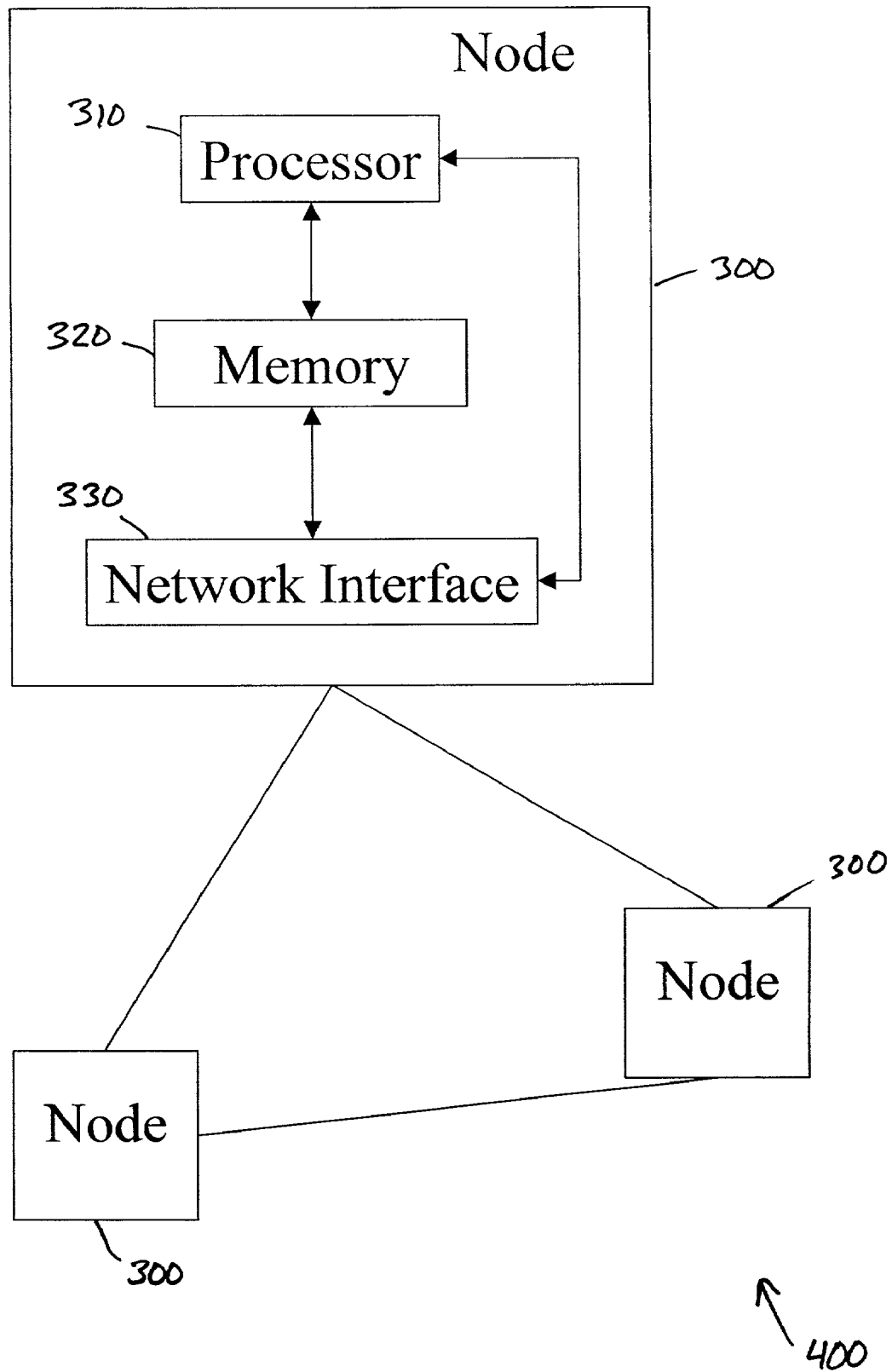
FIG. 3 provides a functional relationship diagram of an apparatus according to the illustrative embodiment of the present invention.

According to another embodiment of the invention, an apparatus is provided to manage a network. An illustrative embodiment is shown by the apparatus 300 of FIG. 3. The apparatus 300 can be a node of a network 400, as shown in FIG. 3. The apparatus 300 includes a processor 310 to communicate with a memory 320 and a network interface 330. Optionally, the memory 320 may communication with the network interface 330. The network interface 300 is adapted to communicate with the network, including switches determining connection paths on the network.

The apparatus 300 is preferably operated in accordance with the methods of the present invention, such as the method of the illustrative embodiment of FIG. 2.

According to the present invention, the apparatus 300 may be provided in each node of a network. Alternatively, or in addition, the apparatus 300 may be provided in a central location for management of the network. Optionally, various components of the apparatus 300 may be remotely located. For example, the memory 320 may be located in a central location, eliminating the need for the memory 320 to be located at each node of the network.

These examples are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

Having described the invention, what is claimed as new and protected by Letters Patent is:

What is claimed is:

1. A method for managing a network having a plurality of nodes and a connection failure along a first connection path, between a first node and a second node, the method including the steps of:
   determining whether a first connection can be established between the first node and the second node;
   if the first connection cannot be established, determining whether a second connection can be established between the first node and a third node located after the second node along the first connection path;
   if the first connection and the second connection cannot be established, determining whether a third connection can be established between a fourth node located before the first node along the first connection path and the second node; and
   if the first connection and the second connection and the third connection cannot be established, determining whether a fourth connection can be established between the fourth node located before the first node along the first connection path and the third node.

2. The method of claim 1, wherein the third node is immediately after the second node, and if the first connection and the second connection cannot be established, the fourth node is immediately before the first node.

3. The method of claim 1, wherein each of the determining steps attempts to determine only non-retracing connections.

4. The method of claim 3, further comprising the steps of:
   establishing a second connection path including one of the group of the first connection, the second connection, the third connection and the fourth connection;
   propagating path information corresponding to the second connection path for a plurality of nodes in the network related to the second connection path.

5. The method of claim 4, wherein each of the determining steps attempts to determine only non-retracing connections.

6. A method for managing a network having a N-hop connection C from a node N0 to a node Nn and a connection failure between a node Nk and a node Nk+1, where $0<=k<n$, the method including the steps of:
   determining if a first connection can be established between the node Nk and the node Nk+1;
   if the first connection cannot be established, determining whether a second connection can be established between the node Nk and a node Nk+i, where i is incremented from 1 to n–k until a determination that the second connection can be established; and
   if the first connection and the second connection cannot be established, determining whether a third connection can be established between a node Nk–j and the node Nk+i, where j is incremented from 1 to k and for every j, i is incremented from 1 to n–k, until a determination that the third connection can be established.

7. The method of claim 6, wherein each of the determining steps attempts to determine only non-retracing connections.

8. The method of claim 7, further comprising the steps of:
   if the first connection can be established, restoring the connection C by establishing a connection between the node Nk and the node Nk+1;
   if the first connection cannot be established and a second connection can be established, restoring the connection C by establishing a connection between the node Nk and the node Nk+i*, where i* is equal to i when the second connection can be established during the step of determining whether a second connection can be established; and
   if the first connection and the second connection cannot be established and a third connection can be established, restoring the connection C by establishing a connection between the node Nk–j* and the node Nk+i*, where i* is equal to i and j* is equal to j when the third connection can be established during the step of determining whether a third connection can be established.

9. The method of claim 8, wherein each of the determining steps attempts to determine only non-retracing connections.

10. The method of claim 8, further comprising the step of propagating path information corresponding to the connection C to nodes in the network related to the connection C.

11. The method of claim 10, wherein each of the determining steps attempts to determine only non-retracing connections.

12. An apparatus for management of a network, comprising:
   a processor adapted to perform the method of claim 1;
   a memory in communication with the processor and adapted to retain information relating to path information of a plurality of nodes;
   a network interface in communication with the processor and capable of communication with the network.

13. The apparatus of claim 12 wherein the memory is remotely located from the processor.

14. An apparatus for management of a network, comprising:
- a processor adapted to perform the method of claim 3;
- a memory in communication with the processor and adapted to retain information relating to path information of a plurality of nodes;
- a network interface in communication with the processor and capable of communication with the network.

15. The apparatus of claim 14 wherein the memory is remotely located from the processor.

16. The apparatus of claim 14 wherein the apparatus is provided at each node of the network.

17. An apparatus for management of a network, comprising:
- a processor adapted to perform the method of claim 6;
- a memory in communication with the processor and adapted to retain information relating to path information of a plurality of nodes;
- a network interface in communication with the processor and capable of communication with the network.

18. The apparatus of claim 17 wherein the memory is remotely located from the processor.

19. An apparatus for management of a network, comprising:
- a processor adapted to perform the method of claim 7;
- a memory in communication with the processor and adapted to retain information relating to path information of a plurality of nodes;
- a network interface in communication with the processor and capable of communication with the network.

20. The apparatus of claim 19 wherein the memory is remotely located from the processor.

21. The apparatus of claim 19 wherein the apparatus is provided at each node of the network.

* * * * *